United States Patent
Krafthefer et al.

(10) Patent No.: US 8,131,495 B2
(45) Date of Patent: Mar. 6, 2012

(54) PARTICULATE MATTER SENSOR CALIBRATION

(75) Inventors: Brian C. Krafthefer, Stillwater, MN (US); Gregory J. Hampson, Stillwater, NY (US)

(73) Assignee: Honeywell International Inc., Morristown, NJ (US)

( * ) Notice: Subject to any disclaimer, the term of this patent is extended or adjusted under 35 U.S.C. 154(b) by 440 days.

(21) Appl. No.: 12/194,401

(22) Filed: Aug. 19, 2008

(65) Prior Publication Data

US 2010/0049462 A1    Feb. 25, 2010

(51) Int. Cl.
*G01F 25/00* (2006.01)

(52) U.S. Cl. ........ 702/104; 702/127; 702/128; 702/129; 702/130; 702/140; 73/865.5; 73/866.5; 73/23.31; 204/424; 204/425; 204/426; 204/427; 204/428; 60/285; 60/287; 60/291; 60/295; 60/297; 60/311

(58) Field of Classification Search .......... 702/104, 702/127–129, 138, 140; 73/865.5, 866.5, 73/23.31; 204/424–428; 60/285, 287, 288, 60/291, 295, 297, 311

See application file for complete search history.

(56) References Cited

U.S. PATENT DOCUMENTS

| | | | |
|---|---|---|---|
| 6,971,258 B2 | 12/2005 | Rhodes et al. | |
| 7,275,415 B2 | 10/2007 | Rhodes et al. | |
| 7,322,182 B2 | 1/2008 | Ueno et al. | |
| 7,343,738 B2 | 3/2008 | Tsutsumoto et al. | |
| 2003/0196499 A1* | 10/2003 | Bosch et al. | 73/865.5 |
| 2008/0072756 A1* | 3/2008 | Lee | 96/19 |
| 2008/0307772 A1* | 12/2008 | Kawamura et al. | 60/285 |

FOREIGN PATENT DOCUMENTS

WO  WO-2007050384 A2  5/2007

* cited by examiner

*Primary Examiner* — Sujoy Kundu
(74) *Attorney, Agent, or Firm* — Schwegman, Lundberg & Woessner, P.A.

(57) ABSTRACT

A system includes a filter, a sensor, a processor, and a memory. The filter can be coupled to an engine exhaust and can operate in an accumulating mode during which particulate matter (PM) from the engine is trapped and also operate in a regenerating mode during which PM in the filter is emitted. The sensor is coupled to a discharge port of the filter and has an output to provide a sensor signal based on a concentration of PM in the filtered exhaust. The processor is coupled to receive the sensor signal and operable to determine at least one of a base level for the sensor signal during the accumulating mode and a regenerate level for the sensor signal during the regenerating mode, and operable to determine a calibration value for the sensor using at least one of the base level and the regenerate level. The memory stores the calibration value.

19 Claims, 4 Drawing Sheets

PARTICULATE MATTER SENSOR CALIBRATION

BACKGROUND

A diesel particulate filter (DPF) traps particulate matter (PM) or soot in exhaust discharged from an engine. With increased soot loading in the DPF, exhaust flow resistance increases, engine performance deteriorates, and the DPF can be damaged.

Accumulated PM can be removed from a DPF using a process referred to as regeneration. Regeneration can be either actively initiated by an engine controller or it can be passively on-going such that a PM oxidation temperature is achieved during normal engine operation (high load leading to engine exhaust above the light-off temperature).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Some regulatory agencies (such as the Environmental Protection Agency of the United States of America) impose requirements under which harmful particulate emissions from an engine are limited and under which a manufacturer is obligated to certify that their products are operating properly in service.

An accurately calibrated PM sensor can be used to meet these regulatory requirements.

Figure 1:
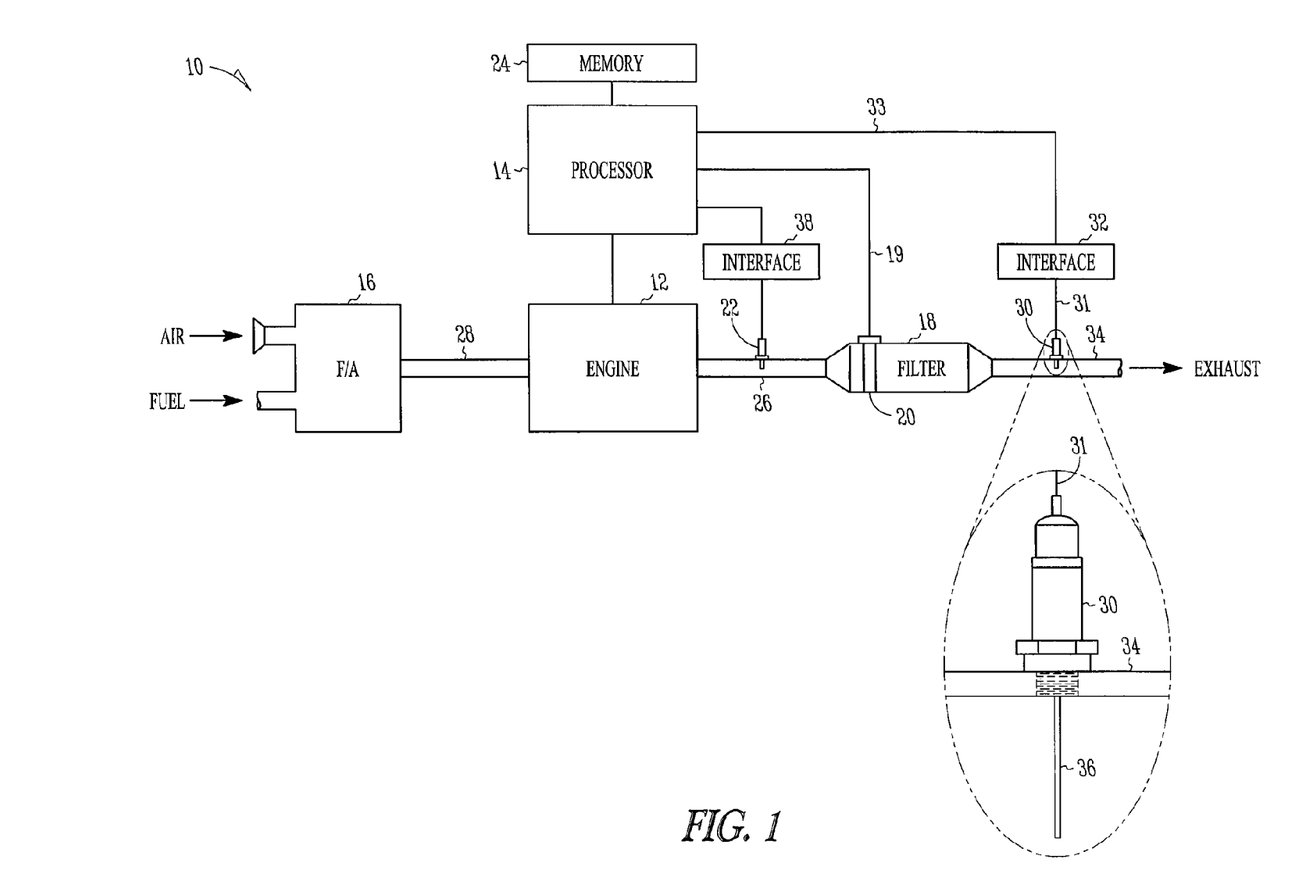
FIG. 1 illustrates a system, according to an example embodiment.

FIG. 1 illustrates system 10 including engine 12, fuel/air controller 16, processor 14, filter 18, and sensor 30.

Engine 12 can include an internal combustion engine. Engine 12 can include any of a variety of powerplants, including a diesel engine for use with diesel fuel. Engine 12 can be naturally aspirated or have forced induction (e.g., turbocharged or supercharged). Engine 12 can be installed in a vehicle or in a stationary machine.

Fuel/air controller 16 can include a fuel injection unit, a carburetor, a fuel controller, or other system to meter fuel and combustion air. In one example, engine 12 includes a forced induction engine and port injection fuel/air controller 16. In one example, the fuel can be injected directly into cylinders of engine 12 while the fuel injection rate is controlled by controller 16. Labeled arrows in the figure denote the intake direction for fuel flow and air flow at fuel/air controller 16.

Fuel/air controller 16 is coupled to engine 12 by intake manifold 28. In a fuel injected engine, fuel/air controller 16 and intake manifold 28 can represent a fuel injection system including injector nozzles and an air metering system.

In the example illustrated, the exhaust, including combustion byproducts, is directed away from engine 12 by exhaust conduit 26, through filter 18, and thereafter, vented to atmosphere by exhaust conduit 34. Exhaust conduit 26 precedes filter 18 and includes sensor 22. Exhaust conduit 34, sometimes referred to as a tailpipe or a discharge port, includes sensor 30. A portion of the exhaust can be bled off to power a turbocharger (not shown). A muffler (not shown) may be included after filter 18. The direction of flow of exhaust from exhaust conduit 34 is shown by a labeled arrow.

Sensor 22 includes an element that measures a parameter as to exhaust conduit 26. Various parameters can be measured, some of which can include a pressure, a temperature, particle mass, and a flow rate. In some embodiments, sensor 22 includes a thermocouple, element, a piezoelectric element, and in one example, a micro-electromechanical system (MEMS) element. In one example, sensor 22 operates in cooperation with another sensor (not shown) to provide information to monitor a differential pressure across, for example, filter 18.

Sensor 22 is coupled to processor 14 by interface 38. In some embodiments, interface 38 includes one or more of a signal conditioning circuit, an amplifier, an analog-to-digital converter (ADC), a digital signal processor (DSP), a memory, or some further circuit.

Filter 18 can include a DPF. A DPF, for example, includes an internal monolith by which the exhaust flows through a filter media. A DPF can remove diesel PM or soot from the exhaust of a diesel engine. Exhaust conduit 34 carries the filtered exhaust discharged from filter 18.

After accumulating PM, a DPF can be cleaned by a process referred to as regeneration. A variety of regeneration methods can be used, some of which entail heating the filter to a temperature above a particular value, such as 400-700° C. In the example illustrated, regenerating unit 20 can be an electric heater used to regenerate filter 18. Regenerating unit 20 can also include a fuel burner, a catalyst injector, or some other device to heat the exhaust gas to a temperature sufficient to oxidize PM. As used herein, the flow of exhaust carries the products from the combusted PM from filter 18 during regeneration.

Processor 14 is coupled to filter 18 and to regenerating unit 20 by link 19. In the example illustrated, link 19 can be bi-directional in that information can be conveyed from filter 18 and regenerating unit 20 and an instruction (or control signal) can be conveyed from processor 14. For example, link 19 can carry a signal from regenerating unit 20 to processor 14 that indicates a temperature or a fuel flow rate at a fuel burner located within regenerating unit 20. Also, link 19 can carry a signal from processor 14 to regenerating unit 20 to cause, for example, regenerating unit to adjust a temperature within filter 18.

Sensor 30 measures a parameter of the discharge (filtered exhaust) from exhaust conduit 34. In one example, sensor 30 includes a PM sensor (cbPMs) which provides a time-varying electrical signal output based on a concentration of electrically charged PM. According to one theory, the PM is charged by combustion during normal operation of engine 12. An electrical signal from sensor 30 can be amplified, digitized, processed and analyzed. In various examples, sensor 30 provides a sensor signal based on the number of charged particles or the total charge flux in the filtered exhaust. Sensor 30 can also include a PM sensor that relies on a principle of operation other than detecting charged particles.

Sensor 30, as shown in the oval inset of FIG. 1, includes a cbPMS having an electrode, in the form of a transducer probe 36, positioned within exhaust conduit 34. Probe 36 includes a passivated, electrically isolated, metal rod. Sensor 30, in one example, provides post-DPF measurement of PM.

Sensor 30 is coupled to processor 14 and provides data on the carbonaceous PM concentration in the exhaust. The output signal from sensor 30 varies with the carbon mass concentration in the filtered exhaust. In one example, a detected flow of PM appears as a voltage at an output of sensor 30.

Sensor 30 is coupled to interface 32 by link 31. Interface 32 can include a signal conditioning circuit, an amplifier, an ADC, a DSP, a memory, or other circuit to communicate a signal between sensor 30 and processor 14. In one example, interface 32 includes a charge amplifier, a data extraction unit and an output conditioning unit.

Interface 32 is coupled to processor 14 by link 33. Link 33 can be bi-directional. Accordingly, interface 32 can receive a signal from processor 14 indicative of, for example, an updated calibration value generated by processor 14 for use by interface 32. The calibration value can affect, for example, a gain of an amplifier of interface 32.

Processor 14 is coupled to memory 24. Memory 24, in various examples, includes a read-only memory (ROM), a random access memory (RAM), a flash memory, a dynamic RAM (DRAM), and a removable memory device. In one example, memory 24 provides storage for executable instructions on which processor 14 performs a method. The method, for example, can include generating an updated calibration value as described herein. In one example, memory 24 provides storage for a database. The database, for example, can store historical data for sensor 30, performance data for filter 18, or a calibration value for sensor 30. Processor 14, in various examples, can be an element of an engine control unit, an emission control unit (ECU), or an on-board diagnostic (OBD) system.

Any of links 19, 31, and 33 (as well as those not otherwise labeled) can include a wired channel or a wireless channel. A wired channel can include an engine wiring harness. A wireless channel can include a radio frequency communication channel, an optical communication channel (such as infrared), an ultrasonic link, or other communication channel.

Filter 18 can be operated in an accumulating (also referred to as trapping) mode and in a regenerating mode. During the accumulating mode, filter 18 filters emission of particulates, thus trapping PM from engine 12. Filter 18, while operating in the accumulating mode, may allow some amount of PM to pass into the discharge for venting by exhaust conduit 34.

During regenerating mode, PM in filter 18 is combusted, thus removing the accumulated soot from filter 18. Regeneration entails burning off accumulated PM from filter 18. This can include increasing the temperature of filter 18 to light off the accumulated PM, introducing a catalyst to filter 18, adding fuel to the intake of a diesel oxidation catalyst (DOC, not shown in the figure) in front of filter 18, or any of a number of other methods leading to combustion of the PM. Filter 18, while operating in the regenerating mode, will discharge an increased amount of charged particles into exhaust conduit 34, downstream of the filter 18.

The mode of operation of filter 18 is determined by a selection signal coupled to filter 18. In one example, processor 14 provides a signal to filter 18 (or unit 20) to select accumulating mode or regenerating mode. The mode selection signal can be provided to filter 18 using link 19. Filter 18 can toggle between accumulating mode and regenerating mode based on a clock signal, a temperature measurement, a mass accumulation measurement, a pressure measurement, or by some other parameter as determined, for example, by processor 14.

Figure 2:
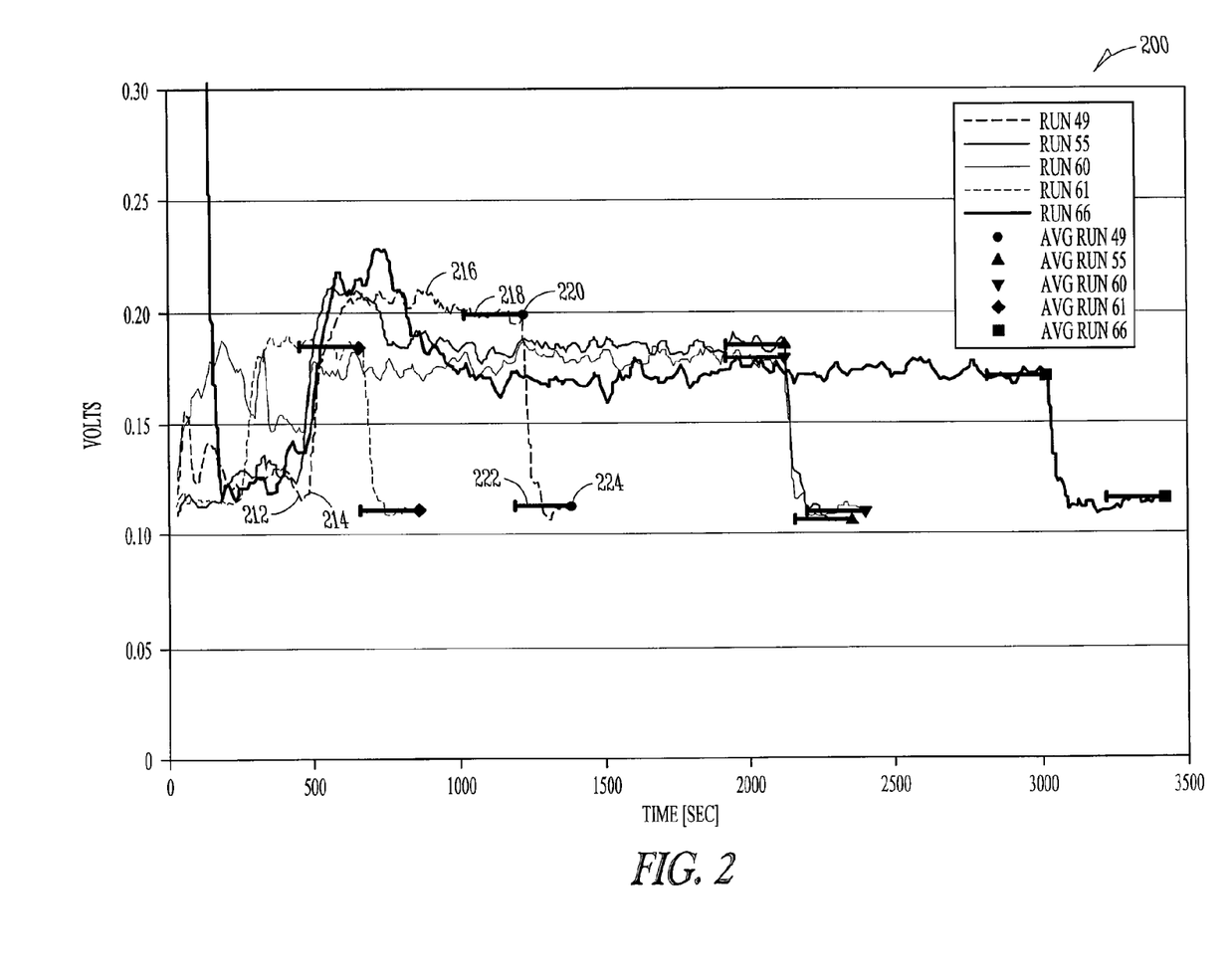
FIG. 2 illustrates a graph of voltage and time, according to an example embodiment.

During regeneration, charged particles are emitted from filter 18. FIG. 2 illustrates graph 200 covering a window of time including five sample regenerating cycles. Graph 200 shows charged particle emissions from filter 18, as detected by sensor 30. Time, in seconds, is shown on the horizontal axis and voltage is shown on the vertical axis.

Cycle 212 is a representative plot of raw sensor output. Cycle 212 shows a moderately low level of PM emissions for time prior to approximately 500 seconds in the time window shown. Prior to approximately 500 seconds in the time window shown, cycle 212 depicts operation in an accumulating mode. At point 214, the accumulating mode of operation for filter 18 ends. At sometime after point 214, filter 18 transitions to the regenerating mode. This can include adding a catalyst or fuel to filter 18 or it can include raising the temperature of filter 18. Filter 18 begins the regenerating mode of operation when the accumulated PM begins to combust. While filter 18 is operating in the regenerating mode, the emissions show a marked increase that rises to a plateau level. At point 216, PM is burning off and filter 18 is operating in the regenerating mode.

In the example shown, at point 220 (coinciding with approximately 1250 seconds) the regenerating mode of operation ends and sometime thereafter, filter 18 begins the accumulating mode of operation. The regenerating mode can have a duration determined by a clock signal, by a temperature measurement, by a pressure measurement, or by some other parameter as determined, for example, by processor 14. While in the accumulating mode, the emissions drop to a level below that during regenerating. At 224, filter 18 is in the accumulating mode.

Horizontal line 218 has a length representing approximately 200 seconds and terminates at point 220 which represents a mean value for the sensor output during the regenerating mode. In a similar manner, horizontal line 222 represents a time window for the sensor output during accumulating mode (following regenerating mode) with point 224 denoting a mean value. In the example illustrated, point 220 and point 224 correspond to running averages over the time denoted by horizontal lines 218 and 222, respectively.

The running averages represent sensor outputs for the different operational modes of filter 18. In one example, processor 14 calculates the running average values and uses this information to calibrate sensor 30.

A running average, sometimes referred to as a moving average or rolling average, is an example of analysis applied to time series data. Other time series analysis can also be used, including convolution and various types of smoothing functions. In one example, the data is digitized and analyzed in the frequency domain to determine a representative value.

FIG. 2 illustrates a relatively consistent rise in charged particle emissions for the regeneration cycles and a relatively consistent level following regeneration (during accumulating mode). Provided that system 10 is functioning properly, the output levels provided by sensor 30 are relatively consistent and can be used to calibrate sensor 30.

An example of the present system uses the post-regeneration signal amplitude to automatically set the zero level of the calibration and uses the delta (difference between a regenerate level and a base level) for calibrating span. When properly calibrated, sensor 30 provides accurate measurement of PM emissions.

An example of the present system can be included in an On-Board Diagnostic (OBD) system. In an OBD system, the PM sensor can be used to detect a failing or failed DPF. The "regeneration scale" approach can be used for absolute calibration or can be used to provide a floating scale which increases the likelihood of detecting sudden "break-through" or sudden loss of filtration efficiency. In addition, tracking both the zero and gain of the "regen scale" enables "auto-zero" functionality as well as diagnostics on the sensor. Slow drift in the zero and gain can thus be accounted for.

Figure 3A:
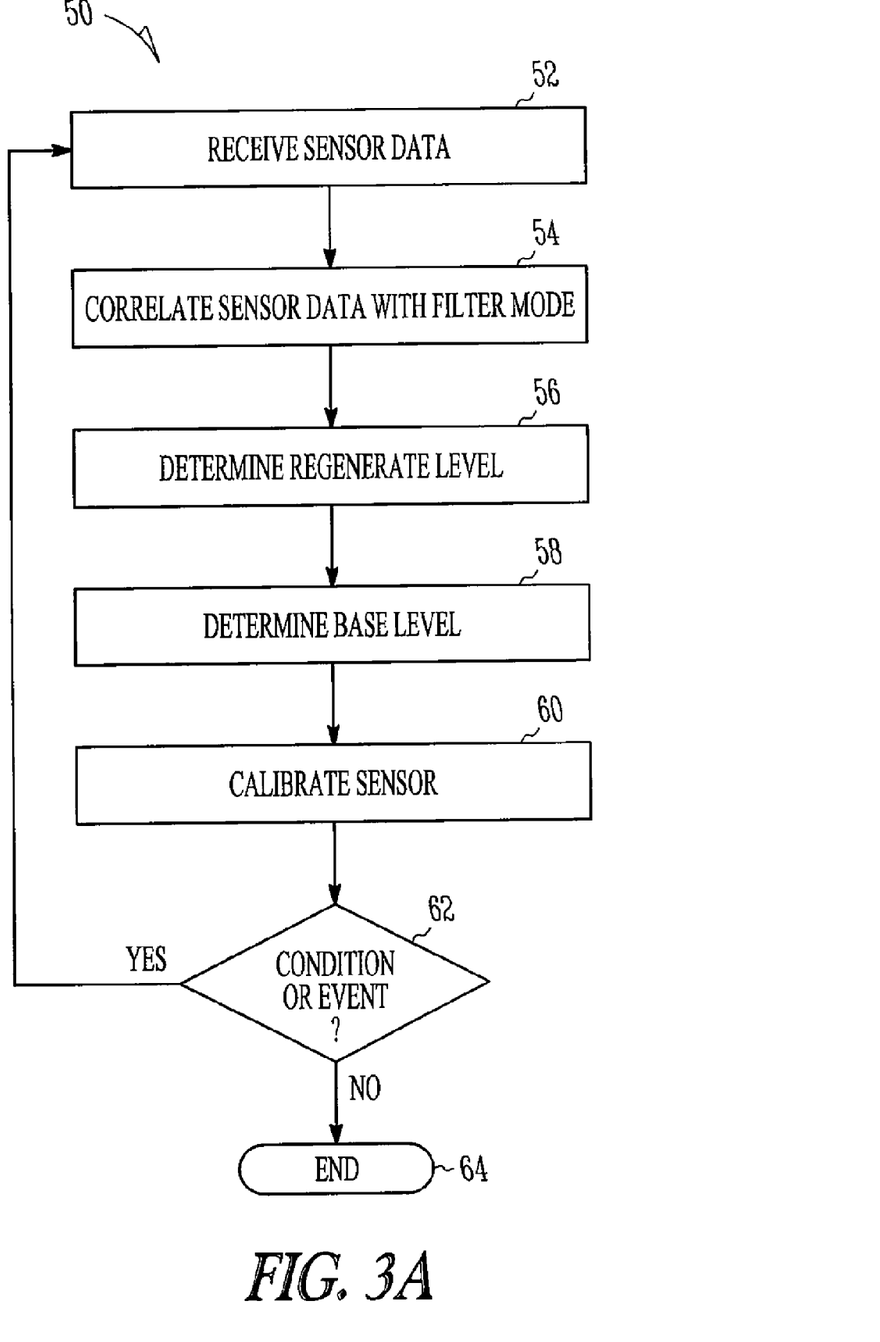
FIGS. 3A and 3B illustrate flow charts of methods, according to example embodiments.

FIG. 3A illustrates method 50, according to one example embodiment. At 52, data from sensor 30 is received. The data can be received by processor 14 and stored in memory 24. The data includes a time series of measurements for PM emissions, as detected in the discharge (downstream) of filter 18, and covers a time period during which filter 18 is operating in a regenerating mode and in an accumulating mode.

At 54, the time series of sensor data is correlated with a mode of operation for filter 18. A mode of operation for filter 18 can be determined by a user input, one or more measured values, a clock, or by other means. The output signal from sensor 30 is correlated with the particular operational mode to ensure agreement as to the output signal and the filter mode for purposes of calibrating sensor 30. Correlating the sensor data can include determining the time of start of a regenerating mode, determining the time of ending the regenerating mode, determining the time of start of accumulating mode and determining the time of ending of accumulating mode.

In one example, processor 14 provides a signal to filter 18 (or unit 20) that controls selection of regenerating mode and accumulating mode. The signal from processor 14 can be used to correlate the sensor data with the filter mode. Processor 14 may call for a particular filter mode based on a measured parameter for system 10. The measured parameter can include a specific temperature threshold or a pressure threshold.

Other methods can be used to control selection of the operating mode for filter 18. For example, a user can control the selection of the operating mode and provide a signal to correlate the sensor data with the filter mode. In one example, stored data can be used to identify the operational mode of the filter. The stored data can include a pattern of use of engine 12, a type of fuel, or any other systematic pattern of use.

In one example, processor 14 executes a method to statistically analyze data from a sensor (e.g., sensor 30 or sensor 22) in order to determine the start and end times of the regenerating mode and accumulating mode. The results of the method are used to correlate the sensor data with the filter mode.

Other methods can be used to correlate the sensor data with the filter modes. In one example, the received sensor data includes measurements collected during a 30 second window prior to onset of a regenerating mode. As shown in graph 200, this represents a window within the time between 0 and 500 seconds. A running average for sensor output prior to onset of the regenerating mode is denoted as PM1.

At 56, a measure of a regenerate level is determined. The regenerate level is determined using sensor data corresponding to a concentration of PM in the discharge while filter 18 is operating in the regenerating mode. In one example, this includes determining a running average value for sensor output during the regenerating mode. Following the time at point 214 (FIG. 2), filter 18 is operating in a regenerating mode. In one example, a running average value is calculated for the 30 second window prior to termination of the regenerating mode. The running average value during regenerating mode represents a regenerate level and is denoted as PM_Regen. Time windows greater than or less than 30 seconds are also contemplated.

At 58, a measure of a base level is determined. The base level is determined using sensor data corresponding to a concentration of PM in the discharge while filter 18 is operating in the accumulating mode. In one example, this includes determining a running average for sensor output during the accumulating mode. Following the time at point 220 (FIG. 2), filter 18 is operating in an accumulating mode. In one example, a running average value is calculated for the 30 second window following the regenerating mode (and during the accumulating mode). The running average value during accumulating mode represents the base level and is denoted as PM2. Values for PM1, PM_Regen, and PM2 can be stored and continuously updated in memory 24.

At 60, the sensor is calibrated. In one example, the regenerate level and the base level are processed to determine a value for calibrating the sensor. In one example, the value can include a span which corresponds to a difference between the two levels. In one example, calibration entails a non-linear calibration curve in which a parameter in addition to linear gain and zero is stored, calibrated and used.

In one example, the values calculated using the regenerate level and the base level are compared with historical data to identify a variance from normal operation.

At 62, a query is presented to determine if a condition or event has occurred. A condition or event can be used to trigger re-calibration of sensor 30. Processor 14 can evaluate selected data to discern occurrence of a condition or an event. Some examples of a condition or an event include a specified number of start-stop cycles of engine 12, passage of a particular time period, a major repair, and replacement of a system component. In one example, a user input can trigger execution of a calibration routine such as shown at 50. In one example, data is collected continuously and sensor 30 is automatically recalibrated on an on-going basis.

Upon detecting a qualifying condition or event at 62, method 50 returns to 52 where sensor data is again received. In the absence of a condition or event, processing ends at 64.

According to one example, calibrating sensor 30 includes storing a value representing a base level (zero) and a span. The calibration data can be stored in memory 24, interface 32, or in some other storage accessible to processor 14. The present method can be used to calibrate sensor 30 while installed in service on a vehicle and used for on board diagnostics (OBD).

The base level can be denoted as a zero level and in one example, represents an offset value. The span is a measure of the difference between the base level and the regenerate level, and in one example, represents a gain.

In one example, processor 14 executes instructions to evaluate the base level, the regenerate level, and the span. For example, evaluating can include analyzing a trend in a particular value. The stored calibration value can represent a function of previously stored values and a value calculated for the most recent cycle. Processor 14 recalibrates the output from sensor 30 based on the measured values. In one example, the rise in output during regenerating mode is represented by a stored value that is determined for a particular sensor 30 at a time in advance of installation in system 10. In one example, the "regen scale" is set such that the read-out value during regeneration is a value of 1.00 (one) and the value of post-regen is set to 0.00 (zero), such that with such a scale, normal accumulation mode signals will be between 0.00 signifying 'normal accumulation mode' and 1.00 signifying 'normal regeneration' and thus enabling detection of an 'abnormal signal' during accumulation mode and a relative scale of importance to make such a diagnosis.

The present system can be used to check sensor performance or filter performance. Real-time data can be collected and used to calibrate sensor 30. For example, using the "regen scale," if the running signal during accumulation mode increases with time or suddenly jumps to higher values, a statistical significance (such as six sigma methods) can be used to determine if these are normal variations or caused by lost DPF efficiency, break-through, or other failure.

Figure 3B:
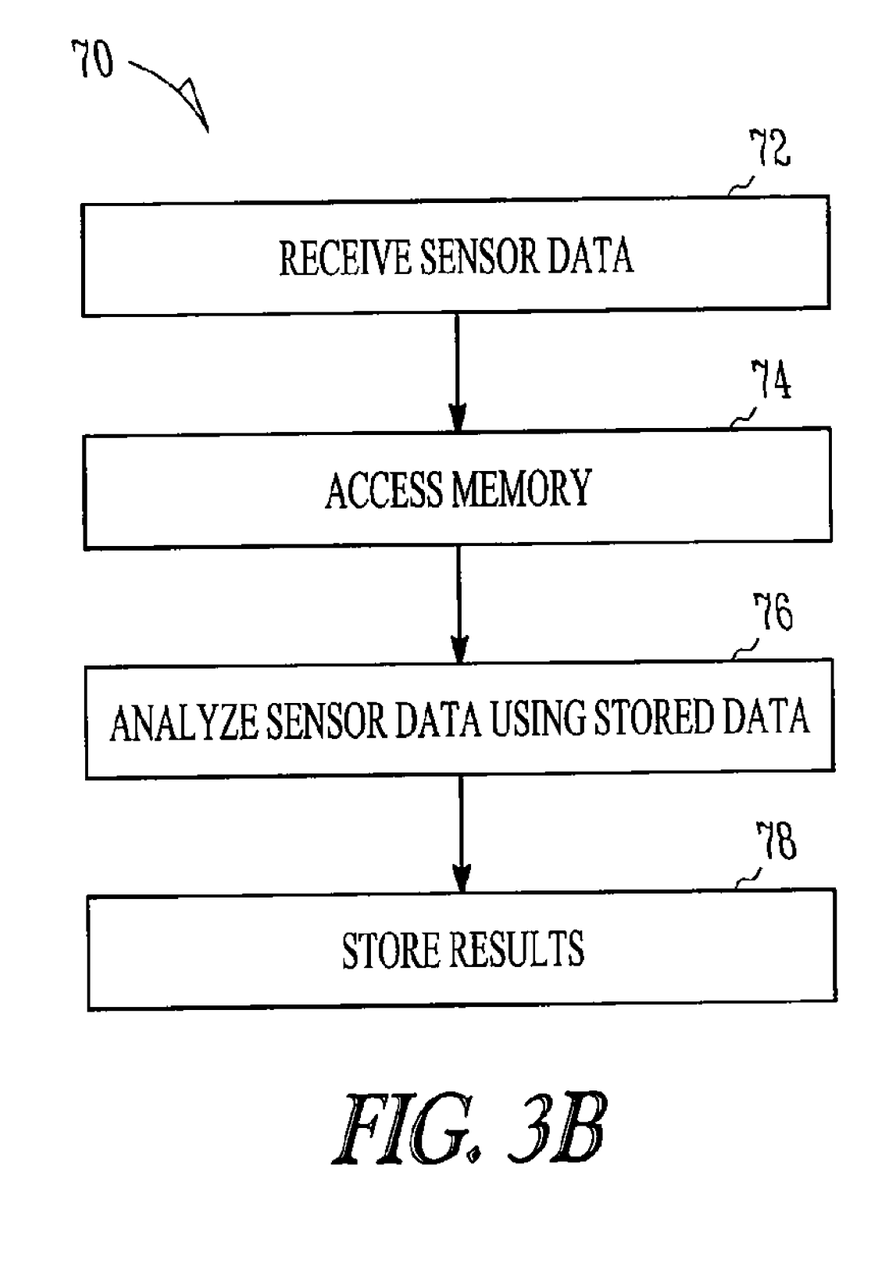

FIG. 3B illustrates an example of method 70 for detecting failure of an emission control system. At 72, method 70 includes receiving data from sensor 30. The sensor data can include a time series of raw PM emission data corresponding to a regenerating mode and an accumulating mode of operation for filter 18.

At 74, the contents of memory 24 are accessed. Memory 24 includes stored PM emissions data from previous cycles of regeneration and accumulation.

At 76, the data from sensor 30 is analyzed using stored data from memory 24. The analysis can include detecting a trend, calculating an average, calculating a standard deviation or variance, correlating data, comparing maximum and minimum values, or other statistical analysis. For example, if the base level for the current cycle indicates a continued rise in value over a specified time period, then a conclusion may be reached as to the performance of a certain component in the emission control system for engine 12. The conclusion may include a value and indicate, for example, that sensor 30 is drifting or that filter 18 is failing.

According to one example, analyzing the sensor data includes calculating running average values for the Regen_Zero (base level) and Regen_Gain (span=regenerate level−base level) based upon previous regeneration and accumulation cycles. The values for Regen_Zero and Regen_Gain can be used to generate Regen_Scale which projects a raw sensor value onto a regenerate coordinate system. For example, the raw data from sensor 30 corresponds to voltage and processor 14 can calculate a Regen_Scale=Regen_Gain×(sensor voltage)+Regen_Zero. In this example, the output is a voltage proportional to Regen_Scale, thus allowing the output to be interpreted as the normal PM signal compared to the Regen_Scale.

Consider an example where the output from sensor 30, during accumulating mode, is 0.2 (or 20%) of the increase in signal for a typical rise to regenerating mode when expressed using Regen_Scale coordinates. In this case, a diagnostic routine (executed using processor 14, for example) can establish a certain threshold, for example, at 0.5. This means that the signal threshold, expressed in Regen_Scale coordinates, is 50% or half of the signal change due to onset of a regenerating mode. The present method can be used for detecting a sudden change in, for example, performance of filter 18, and thus provide data to allow the OBD system to flag an emission control system failure.

At 78, the results of the analysis can be stored in memory 24. In one example, this includes storing statistical data regarding the current cycle. The results can include data regarding a long term trend or a component failure. The results can be logged during routine operation and analyzed statistically. For example, a flag can be set or a notification generated upon identifying an anomaly such as a value that exhibits an excursion exceeding some percentage of a standard deviation.

The calibration values can be used to auto-calibrate the PM sensor for auto-zero and auto-span such that DPF performance is continuously monitored on a vehicle. One example includes an OBD system and is configured to detect slow or sudden loss of DPF PM filtration efficiency and configured to continuously perform sensor diagnostics and auto-calibration during normal operation.

A system includes a filter, a sensor, a processor, and a memory. The filter is to be coupled to an engine exhaust and to operate in an accumulating mode during which PM from the engine is trapped and also to operate in a regenerating mode during which PM in the filter is emitted. The sensor is coupled to a discharge port of the filter and has an output to provide a sensor signal based on a concentration of PM in the filtered exhaust. The processor is coupled to receive the sensor signal and is operable to determine at least one of a base level for the sensor signal during the accumulating mode and a regenerate level for the sensor signal during the regenerating mode and operable to determine a calibration value for the sensor using at least one of the base level and the regenerate level. The memory stores the calibration value.

In one example, the processor calculates a running average sensor signal. The processor can calculate a span corresponding to a difference between the regenerate level and the base level. The system can include a signal conditioning circuit between the sensor output and the processor. The processor can be coupled to the filter and can select the accumulating mode and the regenerating mode. The sensor can include a PM sensor.

A processor implemented method includes receiving data from a sensor for PM in a discharge port from a filter coupled to an engine exhaust. The filter can be operated in an accumulating mode during which PM from the engine is trapped by the filter and in a regenerating mode during which PM in the filter is emitted. The filter mode is determined by a selection signal coupled to the filter. The data corresponds to a concentration of PM in the discharge port during the accumulating mode and during the regenerating mode. The method also includes determining a base level using the data corresponding to PM in the discharge port during the accumulating and determining a regenerate level using the data corresponding to PM in the discharge port during the regenerating mode. The method includes calibrating the sensor using the base level and the regenerate level.

In one example, the method includes calculating an average value using the data. Calculating the average value can include calculating a running average for a predetermined period of time. One example can include identifying at least one of a time of start and a time of end for at least one of the accumulating mode and the regenerating mode. Identifying at least one of the times can include at least one of receiving the selection signal and analyzing the data from the sensor. The method can include calculating a difference between the base level and the regenerate level.

A processor implemented method can include receiving data from a sensor for particulate matter (PM) in a discharge port from a filter coupled to an engine exhaust. The filter is operable in an accumulating mode during which PM from the engine is trapped by the filter and operable in a regenerating mode during which PM in the filter is emitted. The filter mode is determined by a selection signal coupled to the filter. The data represents a concentration of PM in the discharge port during at least one of the accumulating mode and the regenerating mode. The method includes determining a reference level corresponding to at least one of a base level and a regenerate level. The base level uses the data corresponding to a concentration of PM in the discharge port during the accumulating mode and the regenerate level uses the data corresponding to a concentration of PM in the discharge port during the regenerating mode. The method includes comparing the reference level with stored information from a memory. The method includes storing a value based on the comparison in the memory.

A method can include calculating an average value using the data. A method can including calculating a running average for a predetermined period of time. A method can include identifying at least one of a time of start and a time of end for at least one of the accumulating mode and the regenerating mode. A method can include receiving a selection signal or analyzing the data from the sensor. A method can include comparing at least one of a standard deviation, a variance, and a mean value. A method can include identifying a trend.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system comprising:
a filter to be coupled to an engine exhaust, the filter to operate in an accumulating mode during which particulate matter (PM) from the engine is trapped and also to operate in a regenerating mode during which trapped PM in the filter is emitted;
a sensor coupled to a discharge port of the filter, the sensor to provide a sensor signal based on a concentration of PM in the filtered exhaust;
a processor coupled to receive the sensor signal and operable to determine at least one of a base level for the sensor signal corresponding to operation during the accumulating mode and a regenerate level for the sensor signal corresponding to operation during the regenerating mode, and the processor also operable to determine a calibration value for the sensor using the at least one of the base level and the regenerate level; and
a memory to store the calibration value.

2. The system of claim 1 further wherein the processor is operable to calculate a running average of the sensor signal.

3. The system of claim 1 wherein the processor is operable to calculate a span corresponding to a difference between the regenerate level and the base level.

4. The system of claim 1 further including a signal conditioning circuit coupled between the sensor output and the processor.

5. The system of claim 1 wherein the processor is coupled to the filter and operable to select the accumulating mode and the regenerating mode.

6. The system of claim 1 wherein the sensor includes a PM sensor.

7. A processor implemented method comprising:
receiving data from a sensor for particulate matter (PM) in a discharge port from a filter coupled to an engine exhaust, the filter to operate in an accumulating mode during which PM from the engine is trapped by the filter and the filter to operate in a regenerating mode during which PM in the filter is emitted, the filter mode determined by a selection signal coupled to the filter, the data corresponding to a concentration of PM in the discharge port during the accumulating mode and during the regenerating mode;
determining a base level using the data corresponding to PM in the discharge port during the accumulating mode;
determining a regenerate level using the data corresponding to PM in the discharge port during the regenerating mode; and
calibrating the sensor using the base level and the regenerate level.

8. The method of claim 7 wherein determining includes calculating an average value using the data.

9. The method of claim 8 wherein calculating the average value includes calculating a running average for a predetermined period of time.

10. The method of claim 7 wherein determining includes identifying at least one of a time of start and a time of end for at least one of the accumulating mode and the regenerating mode.

11. The method of claim 10 wherein identifying the at least one of the time includes at least one of receiving the selection signal and analyzing the data from the sensor.

12. The method of claim 7 wherein calibrating the sensor includes calculating a difference between the base level and the regenerate level.

13. A processor implemented method comprising:
receiving data from a sensor for particulate matter (PM) in a discharge port from a filter coupled to an engine exhaust, the filter to operate in an accumulating mode during which PM from the engine is trapped by the filter and to operate in a regenerating mode during which PM in the filter is emitted, the filter mode determined by a selection signal coupled to the filter, the data corresponding to a concentration of PM in the discharge port during at least one of the accumulating mode and the regenerating mode;
determining a reference level corresponding to at least one of a base level and a regenerate level, the base level using the data corresponding to the concentration of PM in the discharge port during the accumulating mode and the regenerate level using the data corresponding to the concentration of PM in the discharge port during the regenerating mode;
comparing the reference level with stored information from a memory, the stored information corresponding to the sensor; and
storing a value based on the comparison in the memory.

14. The method of claim 13 wherein determining the reference level includes calculating an average value using the data.

15. The method of claim 13 wherein calculating the average value includes calculating a running average for a predetermined period of time.

16. The method of claim 13 wherein determining includes identifying at least one of a time of start and a time of end for at least one of the accumulating mode and the regenerating mode.

17. The method of claim 16 wherein identifying the at least one of the time includes at least one of receiving the selection signal and analyzing the data from the sensor.

18. The method of claim 13 wherein comparing includes comparing at least one of a standard deviation, a variance, and a mean value.

19. The method of claim 13 wherein comparing includes identifying a trend.

* * * * *